United States Patent
Fujisawa et al.

(10) Patent No.: US 7,588,348 B2
(45) Date of Patent: Sep. 15, 2009

(54) LAMP DEVICE, MANUFACTURING METHOD FOR SAME AND PROJECTOR HAVING A LAMP DEVICE

(75) Inventors: Shohei Fujisawa, Matsumoto (JP); Hiroyuki Kobayashi, Matsumoto (JP); Toru Terashima, Matsumoto (JP); Kazuhiro Tanaka, Matsumoto (JP); Takeshi Takezawa, Matsumoto (JP); Tomonobu Machida, Shiosiri (JP); Yuji Takado, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 151 days.

(21) Appl. No.: 11/049,679

(22) Filed: Feb. 4, 2005

(65) Prior Publication Data

US 2005/0174773 A1     Aug. 11, 2005

(30) Foreign Application Priority Data

Feb. 10, 2004   (JP) ............................. 2004-033698
Nov. 1, 2004    (JP) ............................. 2004-318176

(51) Int. Cl.
*H05B 31/00* (2006.01)

(52) U.S. Cl. ..................... 362/261; 362/262; 362/263; 362/264

(58) Field of Classification Search ............... 362/261, 362/262, 263, 264; 313/113, 567, 573, 623, 313/635; 445/43
See application file for complete search history.

(56) References Cited

U.S. PATENT DOCUMENTS

| | | | |
|---|---|---|---|
| 4,959,583 A | * | 9/1990 | Arsena et al. ............... 313/113 |
| 5,178,712 A | | 1/1993 | Sakai et al. |
| 5,479,065 A | * | 12/1995 | Sugimoto et al. ............ 313/113 |
| 5,532,552 A | * | 7/1996 | Heider et al. ................ 313/623 |
| 5,637,960 A | * | 6/1997 | Juengst et al. ............... 313/625 |
| 5,789,850 A | * | 8/1998 | Iwafuji et al. .......... 313/318.08 |
| 2003/0156728 A1 | * | 8/2003 | Chatani et al. ............... 381/345 |

FOREIGN PATENT DOCUMENTS

| | | | |
|---|---|---|---|
| JP | A-03-236154 | | 10/1991 |
| JP | A-05-333433 | | 12/1993 |
| JP | A-07-272685 | | 10/1995 |
| JP | A 8-031382 | | 2/1996 |
| JP | 2001035440 | * | 2/2001 |
| JP | A-2001-035440 | | 2/2001 |
| JP | A-2003-294921 | | 10/2003 |

\* cited by examiner

*Primary Examiner*—Jong-Suk (James) Lee
*Assistant Examiner*—Mark Tsidulko
(74) *Attorney, Agent, or Firm*—Oliff & Berridge, PLC (57) ABSTRACT

A lamp device and a projector having the lamp device eliminated of light leaking in a direction opposite to a reflecting direction at a rear end of an encapsulation fixing an arc tube on a reflection mirror is simply and inexpensively provided. An arc tube and a reflection mirror are provided. The arc tube has encapsulations one of which is inserted in a cylinder of the reflection mirror thereby securing the encapsulation and the cylinder together by an adhesive. The bulb of the arc tube and the other encapsulation are positioned on a side close to a reflection surface of the reflection mirror. The encapsulation inserted in the cylinder and positioned on a side opposite to the reflection surface has an end at least at an end face of which is covered with the adhesive thereby providing light shield.

10 Claims, 7 Drawing Sheets

LAMP DEVICE, MANUFACTURING METHOD FOR SAME AND PROJECTOR HAVING A LAMP DEVICE

BACKGROUND

Exemplary embodiments relate to a lamp device fixing an arc tube on a reflection mirror and to a projector.

In the related art a lamp device has an arc tube having a light emitter and a pair of encapsulations supporting the light emitter adhesively fixed at one encapsulation inserted in a cylinder, the cylinder being provided centrally of a reflection mirror having a curved reflection surface (e.g. JP-A-8-31382). In such a lamp device, the light from the light emitter is reflected by the reflection surface and caused to travel forward of the reflection surface, thus being served for utilization. However, there is a problem that the light leaks oppositely to a reflecting direction at the rear end of the encapsulation fixed in the cylinder of the reflection mirror, thus deteriorating the members arranged in the rear of the lamp device. In this respect, there are countermeasures, including to cover with a mouthpiece as in JP-A-8-31382, to provide a light-shielding plate in the corresponding position on the housing side accommodating the lamp device and so on.

SUMMARY

However, in attaching a mouthpiece to the end of the encapsulation or providing a light-shielding plate on the housing accommodating the lamp device, there is a need to increase the number of components and prepare metal molds for those components, thus leading to mounting-up of product cost.

The exemplary embodiments address or solve the foregoing problem and other problems by providing a lamp device fixing an arc tube on a reflection mirror, the lamp device being eliminated of leaked light in a direction opposite to a reflecting direction at a rear end of an encapsulation fixing the light emitter and reflection mirror without assembling the components separately formed, a manufacturing method for the same, and by providing a projector having the lamp device.

A lamp device of the exemplary embodiments include: a reflection mirror having a concave reflection surface and a cylinder provided centrally of the reflection mirror; and an arc tube including a bulb positioned on a side of the reflection mirror corresponding to the concave reflection surface, electrodes incorporated in the bulb, and a pair of encapsulation formed continuously from the bulb and supporting the bulb; one encapsulation of the pair of encapsulations being inserted in the cylinder; the encapsulation inserted in the cylinder being secured by a light-shielding adhesive inserted between the cylinder and the encapsulation, the bulb being supported only by the light-shielding adhesive and the one encapsulation in the cylinder, the one encapsulation having an outer periphery that opposes inner surfaces of the cylinder, the outer periphery being covered with the light-shielding adhesive and including an end face and opposing side surfaces of the one encapsulation.

According to this lamp device, the simple structure of covering with an adhesive enables the structure to block the light from leaking, opposite to a reflection upon the reflection mirror, at the end of the one encapsulation. This can avoid the effect of leaked light upon the members arranged in the rear of the lamp device.

Where the one encapsulation projects from the cylinder opposite to a reflection surface, the projection may be covered with the light-shielding adhesive. Because the projection of the one encapsulation projecting opposite to the reflection surface from the cylinder is entirely covered by a light-shielding adhesive, it is possible to positively block the light from leaking in a direction opposite to a reflection on the reflection mirror at the encapsulation. This can avoid, reduce or minimize the effect of leaked light upon the members arranged in the rear of the lamp device.

The light-shielding adhesive may have a surface coated with a heat-resistive paint lower in viscosity than the light-shielding adhesive. By coating the surface of the light-shielding adhesive with a heat-resistive paint, deterioration and collapse at the surface of the adhesive due to heat and strip off of the coating at the end of the encapsulation may be prevented or discouraged.

A power feed line for feeding power to the electrode may be extended from the end face of the one encapsulation secured in the cylinder. The power feed line may have an extension from the end face sustained by the light-shielding adhesive.

This can greatly reduce or minimize the cutting of or damage to the power feed line at the extension of the power feed line and at the end of the encapsulation as well as the breakage in the arc tube, caused by an external force applied to the power feed line.

The power feed line may be bent at the extension to a direction different from a direction of being extended from the end face, a bend of which may be covered by the light-shielding adhesive.

This can prevent or discourage the extension of the power feed line from being directly applied by an external force because of the presence of the bend even when an external force is applied to the power feed line. Hence, it is possible to greatly reduce or minimize the cutting in or damage to the power feed line at the extension of the power feed line and at the end of the one encapsulation, as well as the breakage in the arc tube.

Furthermore, the adhesive between the cylinder and the encapsulation and the light-shielding adhesive may be of a same kind.

Accordingly, there is no need to increase the kind of adhesives. Meanwhile, when injecting the adhesive between the cylinder and the encapsulation, light blocking is also possible at the encapsulation, thus reducing or minimizing the cost for the lamp device.

A lamp device of the exemplary embodiments includes a reflection mirror having a concave reflection surface and a cylinder provided centrally of the reflection surface; and an arc tube including a bulb positioned on a side of the reflection mirror corresponding to the concave reflection sureface, electrodes incorporated in the bulb, and a pair of encapsulations formed continuously from the bulb and supporting the bulb, one encapsulation of the pair of encapsulations being inserted in the cylinder; a first adhesive located between the cylinder and the one encapsulation to secure the one encapsulation directly to the cylinder, the one encapsulation having an outer periphery that opposes inner surfaces of the cylinder, the outer periphery being covered with the first adhesive including an end face and opposing side surfaces of the one encapsulation; and a second adhesive having a greater adhesive strength than the first adhesive, at least part of a surface of the first adhesive and an end face of the cylinder being coated with the second adhesive; wherein at least one of the first and second adhesives is a light-shielding adhesive.

With this lamp device, the effect due to leaked light can be reduced or avoided upon the members arranged in the rear of the lamp device. In addition, the arc tube formed of quartz glass or the like, if directly contacted with an adhesive having a high adhesion strength, may be eroded to form or cause cracks. Accordingly, by making the first adhesive capable of avoiding or suppressing the erosion on the arc tube and coating the surface of the first adhesive with a second adhesive higher in adhesion than the first adhesive, the first adhesive collapsing at its surface may be prevented or discouraged, and the coverage may be removed at the end of the encapsulation. Furthermore, because the second adhesive covers up to the cylinder end face of the reflection mirror, the fixing force can be further increased between the reflection mirror and the arc tube.

In the lamp device, a power feed line for feeding power to the electrode may be extended from the end face of the encapsulation secured in the cylinder, the power feed line having an extension, from the end face, sustained by the first adhesive and/or the second adhesive.

The power feed line may be bent at the extension in a direction different from a direction of being extended from the end face, a bend of which is covered by the first adhesive and/or the second adhesive.

A projector includes a light source; a light modulator for modulating a luminous flux emitted from the light source according to image information and forming an image; and a projection lens for projecting the image; wherein the light source has a lamp device according to any of the above.

The projector, having the foregoing lamp device, provides improved projector reliability and life by virtue of the effect the lamp device is to exhibit.

A method for manufacturing a lamp device of the exemplary embodiments including an arc tube that includes a bulb that incorporates electrodes, and a pair of encapsulations formed continuously from the bulb and supporting the bulb, one encapsulation of the pair of encapsulations being inserted in a cylinder provided centrally of the reflection mirror having a concave reflection surface such that the bulb is positioned on a side of the reflection mirror corresponding to the reflection surface, thereby securing the one encapsulation directly to the cylinder with a light-shielding adhesive, is provided. The method for manufacturing the lamp device includes: aligning the bulb with the one encapsulation inserted in the cylinder, relative to the reflection surface; and injecting the light-shielding adhesive in a gap between the cylinder and the one encapsulation inserted in the cylinder so that the one encapsulation is secured directly to the cylinder by the light-shielding adhesive and the bulb is supported only by the light-shielding adhesive and the one encapsulation in the cylinder, the one encapsulation having an outer periphery that opposes inner surfaces of the cylinder, the outer periphery including an end face and opposing side surfaces, and the light-shielding adhesive entirely covering the outer periphery.

With this method, it is possible to inject an adhesive to a gap between the cylinder and the one encapsulation and to apply a light-shielding adhesive to an end of the one encapsulation, in a continuous or simultaneous fashion. Furthermore, because those processes can be done by utilization of the same apparatus and the same adhesive, manufacturing cost can be suppressed or reduced for the lamp device.

Meanwhile, a method for manufacturing a lamp device including an arc tube having a bulb that incorporates electrodes and a pair of encapsulations formed continuously from the bulb and supporting the bulb, one encapsulation of the pair of encapsulation being in a cylinder provided centrally of the reflection mirror having a concave reflection surface such that the bulb is positioned on a side of the reflection mirror corresponding to the reflection surface, thereby securing the one encapsulation directly to the cylinder with a first adhesive, the method for manufacturing a lamp device comprising: aligning the bulb with the one encapsulation inserted in the cylinder, relative to the reflection surface; a first adhesive application injecting the first adhesive in a gap of between the cylinder and the one encapsulation inserted in the cylinder so that the one encapsulation is secured directly to the cylinder by the first adhesive and the bulb is supported only by the first adhesive and the one encapsulation in the cylinder, the one encapsulation having an outer periphery that opposes inner surface of the cylinder, the outer periphery including an end face and opposing side surfaces, and the first adhesive entirely covering the outer periphery; and a second adhesive application covering at least part of a surface of the first adhesive and an end face of the cylinder with a second adhesive having a greater adhesive strength than the first adhesive; wherein at least one of the first and second adhesives is a light-shielding adhesive.

This method can obtain a lamp device having a light-shielding effect mainly aimed at by the exemplary embodiments. In addition, the arc tube formed of quartz glass or the like, if directly contacted with an adhesive high in adhesion strength, is eroded to form a cause of cracks. Accordingly, by using the first adhesive for avoiding or suppressing from erosion on the arc tube and coating the surface of the first adhesive with a second adhesive higher in adhesion than the first adhesive, collapse of the first adhesive at its surface and removal of the coverage at the end of the one encapsulation may be prevented. Furthermore, because the second adhesive covers up to the cylinder end face of the reflection mirror, the fixing force can be further increased between the reflection mirror and the arc tube.

DETAILED DESCRIPTION OF EMBODIMENTS

With reference to the drawings, a lamp device according to an exemplary embodiment of the present invention is described, as well as a method for manufacturing the lamp device and a projector equipped with the lamp device. Note that, in the figures, the same elements are attached with the same references, redundant discussions of the same elements are thereby omitted.

[Exemplary Lamp Device Structure]

Figure 1:
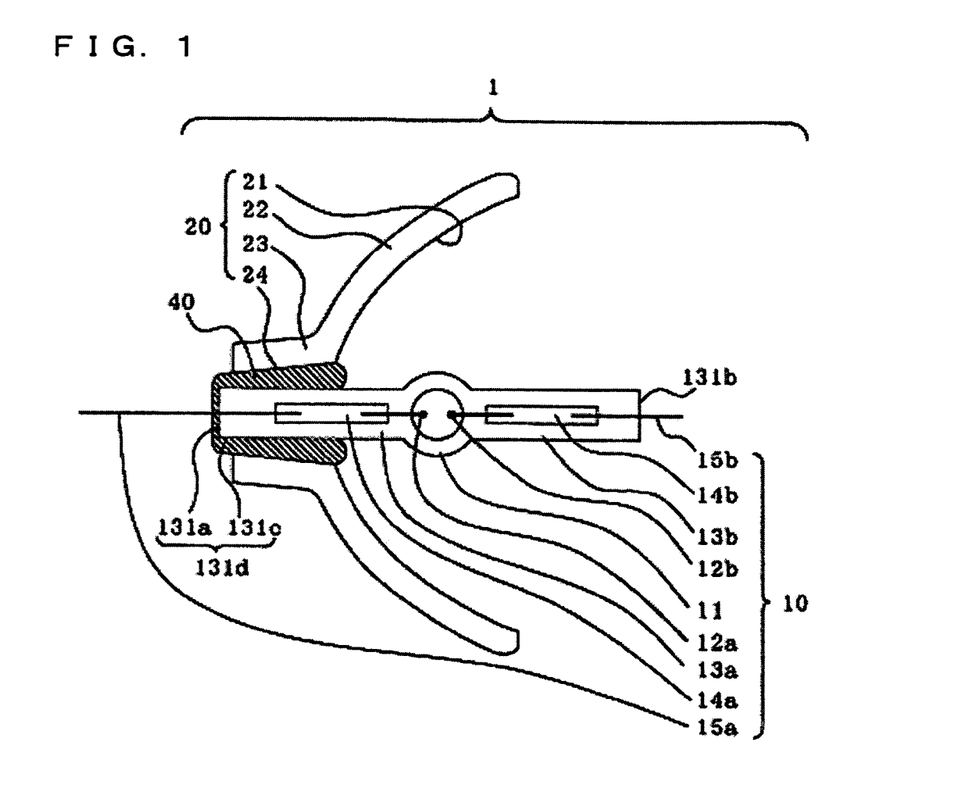
FIG. 1 is a sectional schematic showing a structure of a lamp device according to an exemplary embodiment of the present invention.

FIG. 1 is a sectional schematic showing a structure of a lamp device 1 according to an exemplary embodiment of the present invention. The lamp device 1 has an arc tube 10 and a reflection mirror 20. The arc tube 10, for example, a high-pressure mercury lamp, is formed of quartz glass or the like. The arc tube 10 has a center bulb 11, a pair of encapsulations 13a, 13b formed on the both sides of the bulb 11 and continuous from the bulb 11. Within the bulb 11, mercury, rare gas, a small amount of halogen, and/or the like, etc. are sealed to arrange electrodes 12a, 12b. The electrodes 12a, 12b may be formed of, for example, tungsten. The pair of encapsulations 13a, 13b are each sealed with a metal foil 14a, 14b, respectively, formed of, for example, molybdenum or the like and may be connected to the electrodes 12, 12b, respectively. Power feed leads 15a, 15b extend respectively from the metal foil 14a, 14b to feed power to the electrodes 12a, 12b and extend from the metal foil 14a, 14b to each end face 131a, 131b of the encapsulations 13a, 13b. The arc tube 10 is not limited to a high-pressure mercury lamp but may be a metal halide lamp, a xenon lamp or the like.

The reflection mirror 20 has a reflection base 22 having a concave reflection surface 21 formed in the form of a paraboloid of a revolution or an ellipsoid of a revolution. The reflection mirror 20 further has a cylinder 23 for inserting and fixing therein one encapsulation 13a of the pair of encapsulations 13a, 13b of the arc tube 10. The cylinder 23 is a cylindrical body extending from a center of the reflection base 22 toward a side opposite to the reflection surface 21. The cylinder 23 has therein a through-hole 24 coaxial to a rotary axis of the reflection surface 21. The reflection base 22 and the cylinder 23, may be integrally formed with a heat-resistive glass in a funnel form.

The bulb 11 is arranged on the side of the concave reflection surface 21 of the reflection mirror 20 such that an arc image caused between the electrodes 12a and 12b is in a predetermined position with respect to the concave reflection surface 21. The one encapsulation 13a of the arc tube 10 is inserted in the through-hole 24 of the reflection mirror 20 such that the one encapsulation 13a, at its end 131d, is positioned at the side opposite to the concave reflection surface 21 of the reflection mirror 20. An adhesive 40 filled in a gap between an inner periphery of the through-hole 24 and an outer periphery of the one encapsulation 13a, firmly fixes the arc tube 10 and the reflection mirror 20 together. Meanwhile, the adhesive 40 covers the end face 131a and a side surface 131c at the end 131d of the one encapsulation 13a projecting in a direction opposite to the reflection surface 21 from the cylinder 23. The adhesive 40 aims mainly at firmly fixing the arc tube 10 and the reflection mirror 20 together, at the gap between the inner periphery of the through-hole 24 and the outer periphery of the encapsulation 13a. At the end of the one encapsulation 13a, the adhesive 40 aims mainly to block light from leaking at that end. Accordingly, the adhesive 40, as used here, necessarily possesses a light-shielding nature. A silica-based or alumina-based inorganic adhesive can be employed for such an adhesive. Such adhesives include Sumiceram (Sumiceram: produced by Asahi Chemical Company Limited).

Incidentally, by covering the end face 131a of the one encapsulation 13a with a light-shielding adhesive 40, all or a majority of light can be discouraged or prevented from leaking. However, to further enhance light blockability, the light-shielding adhesive 40 may cover substantially the entire projection of the one encapsulation 13a projecting from the cylinder 23 opposite to the reflection surface 21.

The adhesive 40, at the end face 131a of the one encapsulation 13a, may satisfactorily have a coverage thickness, for example, of approximately 1 mm, which basically is a thickness for blocking light from leaking at the end face 131a, as shown in FIG. 1.

Figure 2:
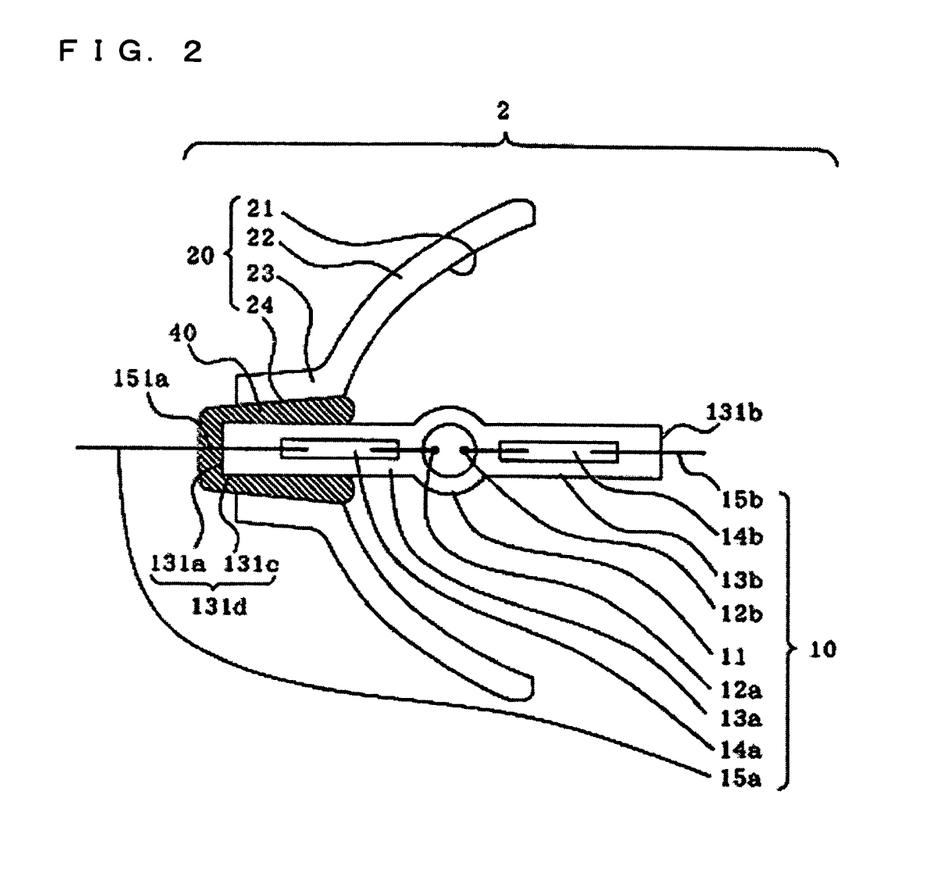
FIG. 2 is a sectional schematic showing a structure of a lamp device according to another exemplary embodiment of the invention.

However, referring to FIG. 2, in order to sustain the extension 151a of the lead wire 15a from the one encapsulation 13a as in a lamp device 2, the adhesive 40 may have a coverage thickness greater than a thickness for blocking leaked light at the end face 131a, for example, approximately 3 mm, so that the adhesive 40 can surround the periphery of the extension 151a of the lead wire 15a from the end face 131a.

Figure 3:
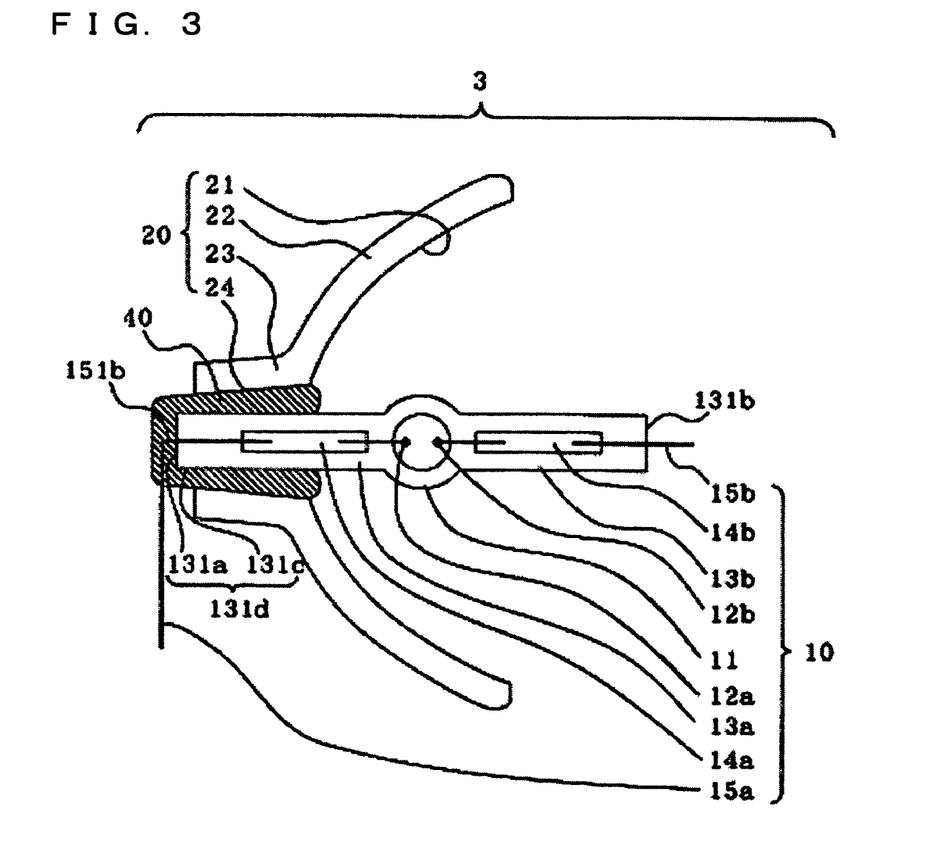
FIG. 3 is a sectional schematic showing a structure of a lamp device according to still another exemplary embodiment of the invention.

Furthermore, referring to FIG. 3, the adhesive 40 may cover an extension 151b bent in a different direction from the direction of extension from the encapsulation 13a, as in a lamp device 3.

The lamp devices 1, 2 and 3, in the above exemplary embodiments offer the following effects.

With the simple and inexpensive structure of covering the end 131d of the encapsulation 13a by application of a light-shielding adhesive 40, the light is blocked from leaking at the end 131d of the one encapsulation 13a, opposite to a reflective direction of the concave reflection surface 21. Thus, avoiding the effect of leaked light upon the members arranged in the rear of the lamp devices 1, 2 and 3 (opposite to a reflective direction of the concave reflection mirror 21).

Where the one encapsulation 13a, at its end 131d, projects from the cylinder 23 opposite to a reflective direction of the reflection surface 21, and the end 131d is substantially or entirely covered with the adhesive 40, it is possible to positively block the light leaking at the one encapsulation 13a opposite to a reflective direction of the reflection mirror 20. Thus, the effect of leaked light upon the members arranged in the rear of the lamp devices 1, 2 and 3 is minimized or avoided.

Where the adhesive 40 covers at least the end face 131a of the end 131d of the one encapsulation 13a, blocking the light is possible at least at the end face 131a, of the end 131d, of the one encapsulation 13a, where leaked light is particularly in the direction opposite to a reflective direction of the reflection mirror 20. Light blocking effects may be realized with a minimal amount of adhesive 40.

Because the end 131d of the one encapsulation 13a is covered by the adhesive 40, securing the cylinder 23 and the one encapsulation 13a, the end 131d of the encapsulation 13a can also be covered when injecting the adhesive 40 between the cylinder 23 and the one encapsulation 13a. Accordingly, it is possible to bond the cylinder 23 and the one encapsulation 13a together, and to block light at the end 131d of the one encapsulation 13a, without increasing the need for the adhesive. This can reduce or minimize cost and simplify the manufacturing process for a lamp device.

In the lamp device 2, the adhesive 40 may cover the end 131d of the one encapsulation 13a in a manner sustaining the extension 151a of the lead wire 15a. Thus, it is possible to significantly reduce the cutting in or damage to the power feed line 15a or a breakage in the arc tube 10, at the extension 151a of the lead wire 15a and at the end 131d of the one encapsulation 13a. The damage to the power feed line may be due to the external force applied to the lead wire 15a by, for example, inadvertent handling of the lead wire 15a.

In the lamp device 3, because the adhesive 40 covers the extension 151b bent in a direction different from the direction of extension from the one encapsulation 13a, the extension 151b thus bent can prevent the external force applied to the power feed line 15a from being directly applied to the power feed line 15a at the end 131d of the one encapsulation 13a. Thus, the power feed line 15a being cut or damaged and the arc tube 10 being broken may be prevented, at the end 131d of the one encapsulation 13a.

Figure 6:
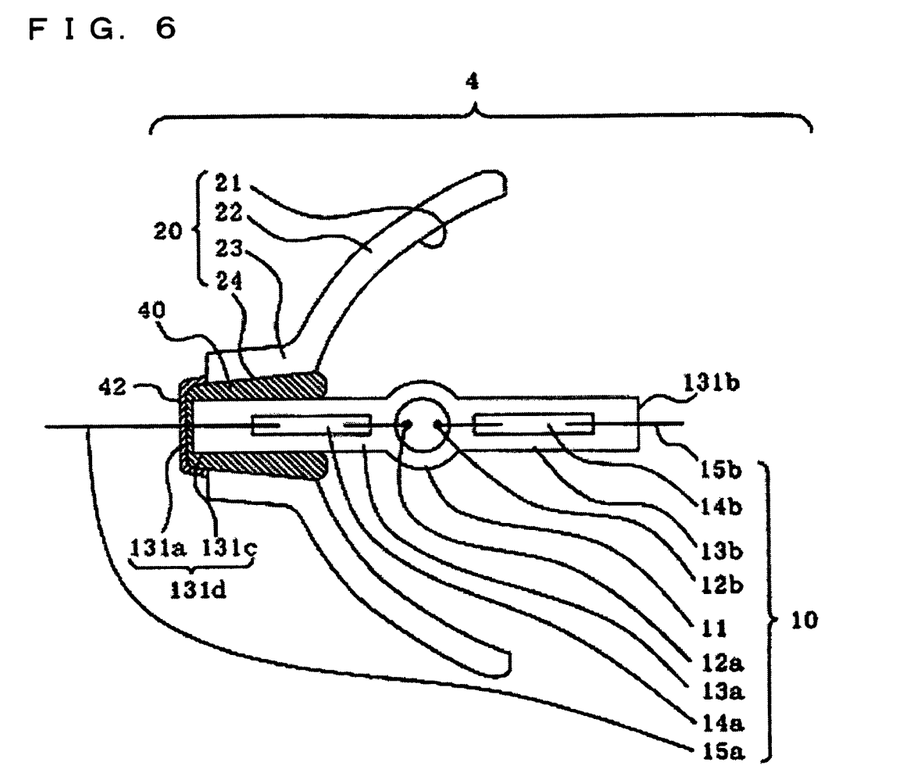
FIG. 6 is a sectional schematic showing a structure of a lamp device according to another exemplary embodiment of the invention.
Figure 7:
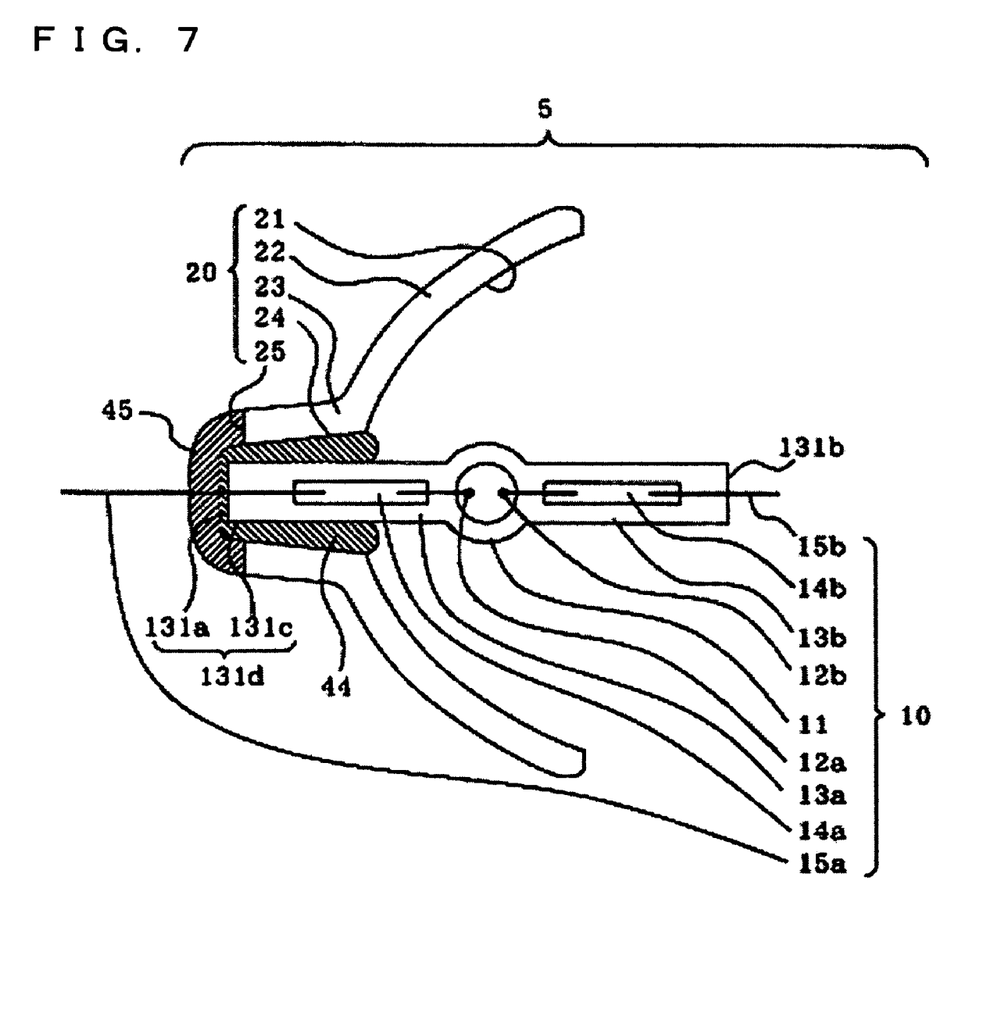
FIG. 7 is a sectional schematic showing a structure of a lamp device according to still another exemplary embodiment of the invention.

The lamp device of the exemplary embodiments can take a form as shown in FIGS. 6 and 7.

The lamp device 4 shown in FIG. 6 is further coated with a heat-resistive paint 42 on the surface of the adhesive 40 (surface opposite to the reflection surface 21) of the lamp device in the structure of FIG. 1. The heat-resistive paint 42 may be lower in viscosity but higher in heat resistance than the adhesive 40.

The lamp device 4 provides the following effect in addition to the effect possessed by the lamp device 1. Namely, by covering the surface of the adhesive 40 with a heat-resistive paint 42 that is lower in viscosity but higher in heat resistance than the adhesive 40, deterioration of the surface of the adhesive 40 can be prevented or discouraged and collapsing due to heat and from being stripped off the coating of the end 131d of the encapsulation 13a may also be prevented or discouraged. Because the heat-resistant paint 42 is lower in viscosity than the adhesive 40, and therefore the heat-resistant paint 42 may thinly and thoroughly cover the surface of the adhesive 40, less effect upon the lamp device form is inflicted.

Because the adhesive 40 and heat-resistive paint 42 is satisfactorily applied to a form of the lamp device 4, application is possible with versatility. This makes it possible to reduce the number of components and the metal molds for fabricating the components. Thus, resources may be saved.

FIG. 7 shows a lamp device 5 which uses a first adhesive 44 in place of the adhesive 40 for the lamp device of the structure in FIG. 1. The first adhesive 44 has a property that will not erode the material of the arc tube 10. A second adhesive 45, higher in adhesion than the first adhesive 44, may be coated on a surface of the first adhesive 44 (surface opposite to the reflection surface 21) and on an end face 25 of the cylinder 23 of the reflection mirror 20. In this case, a light-shielding nature is satisfactorily had by at least one of the first adhesive 44 and the second adhesive 45.

The first adhesive 44 can use alkalescent (having a PH over 8 but lower than 11), for example.

The second adhesive can use alkaline (having a PH over 11 but lower than 12), for example.

The lamp device 5 has the following effect in addition to the effect possessed by the lamp device 1. Namely, by replacing the adhesive in direct contact with the arc tube 10, formed of quartz glass or the like, with a (alkalescent) first adhesive 44 that does not erode the arc tube 10, the first adhesive 44 can secure an inner periphery of the through-hole 24 and an outer periphery of the encapsulation 13a without eroding the arc tube 10. Furthermore, by covering the surface of the first adhesive 44 and the end face 25 of the cylinder 23 of the reflection mirror 20 with the highly-adhesive second adhesive 45, it is possible to prevent or discourage the first adhesive 44 from collapsing at its surface and the end 131d of the encapsulation 13a from being stripped of its coating. Because the reflection mirror 20 is made of a material that is less erosive than the material of the arc tube 10, there is a possibility that the first adhesive 44 may have an insufficient adhesion to the inner periphery of the through-hole 24. However, because the first adhesive 44 and the reflecting mirror 20 are strongly bonded together by the second adhesive 45, positional deviation of the arc tube 10 can be prevented or discouraged.

Because the first adhesive 44 and the second adhesive 45 are satisfactorily applied to a form of the lamp device 5, they are highly versatile. It is possible to reduce the number of components and the metal molds for fabricating the components. Thus, a saving in resources is possible.

In the lamp device 4 shown in FIG. 6 and the lamp device 5 shown in FIG. 7, the lead wire 15a may be bent at its extension from the end of the encapsulation of the arc tube 10, as shown in FIG. 3. In such a case, similar effects discussed above with respect to FIG. 3 may be obtained.

The lamp device of the exemplary embodiments is not limited to the specific exemplary embodiments discussed above. Modifications, revisions or the like within the scope and spirit for achieving the benefits of the exemplary embodiments are included.

For example, a foregoing exemplary embodiment uses the same kind of adhesive 40 in a gap between the inner periphery of the through-hole 24 and the outer periphery of the encapsulation 13a as the adhesive 40 covering the end 131d of the encapsulation 13a. However, the adhesive to be applied to the encapsulation 13a may have different purpose depending upon where it is applied, as described above. For this reason, the kind of adhesive used may vary between the adhesive in the gap between the inner periphery of the through-hole 24 and the outer periphery of the encapsulation 13a, and the adhesive to coat the end of the encapsulation 13a. For example, the adhesive, to be inserted in the gap between the encapsulation 13a and the cylinder 23, does not require a light-shielding nature but must have sufficient adhesion to secure the two parts to each other. The adhesive to coat the end of the encapsulation 13a, including the end face 131a positioned opposite to the reflection surface, may be an adhesive having a light-shielding nature capable of blocking leaked light.

In FIGS. 1 to 3, 6 and 7, the through-hole 24 illustrated in each of these figures, tapers to be slightly broader at a side closer to the reflection surface 21. However, the through-hole 24 is not limited in form but may be nearly constant throughout the length, in a taper form narrower at a side closer to the reflection surface 21, or have a "restriction" partly narrowed. A sub-mirror, for returning part of the emission light from the arc tube 10 once toward the reflection mirror 20, may be provided on the encapsulation 13b in a manner facing the reflection mirror 20.

[Exemplary Lamp Device Manufacturing Method]

Figure 4:
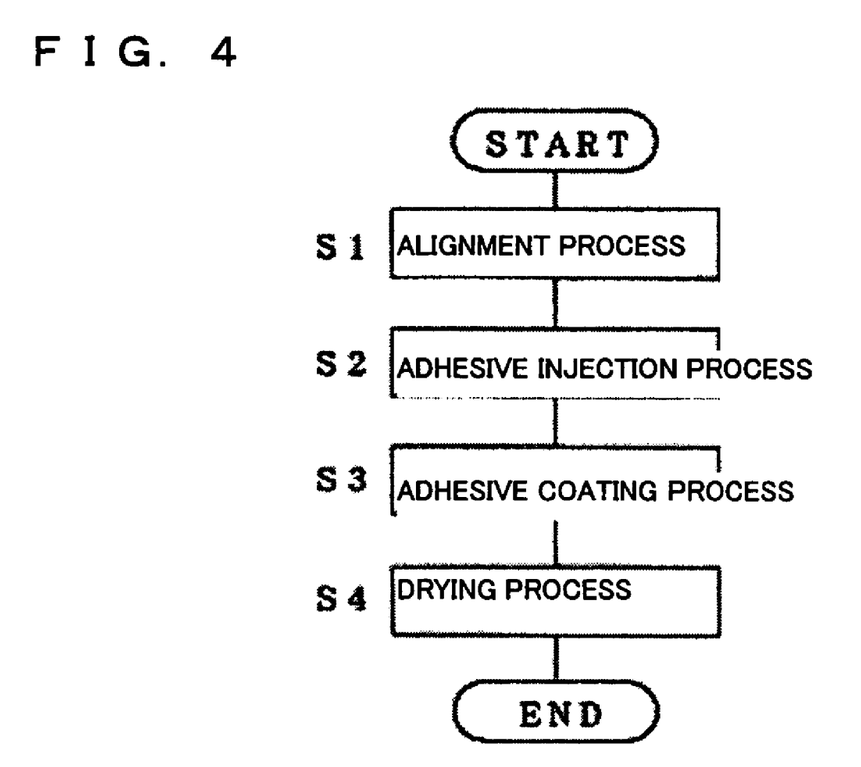
FIG. 4 is a flowchart showing a method for manufacturing a lamp device according to an exemplary embodiment of the invention.

FIG. 4 is a flowchart showing a method for manufacturing lamp devices 1 and 2 according to the present exemplary embodiment. According to this, one example of manufacturing the lamp device 1 is illustrated.

First, alignment for positioning the electrode 11 is shown at step S1. Here, an arc tube 10 and a reflection mirror 20 are prepared. Then, the arc tube 10 at its one encapsulation 13a is inserted in the through-hole 24 in the cylinder 23 of the reflection mirror 20, to make an alignment for positioning the electrode 11 of the arc tube 10 in position relative to the reflection surface 21.

Then, an adhesion injection process is shown at step S2. An adhesive 40 is applied to a bonding region between the cylinder 23 and the encapsulation 13a within the through-hole 24, from a side of the reflection surface 21 of the reflection mirror 20 or from a side opposite to the reflection surface 21.

Subsequently, in an adhesive coating process, as shown at step S3, the same adhesive 40 is applied to coat over the end 131d including the end face 131a of the encapsulation 13a at a side inserted in the cylinder 23, thus providing a light shield.

Where the encapsulation 13a projects in a direction opposite to a reflecting direction from the cylinder 23, the adhesive 40 is further applied to cover the area from the end 131d of the encapsulation 13a to the cylinder 23, i.e. over the entire or substantially the entire end 131d including the side surface 131c of the encapsulation 13a in its region projecting out of the cylinder 23, thus providing light shield. In this case, the adhesive on the end face 131a is given a coating thickness, as required, in a degree capable of sustaining the extension 151a of the lead wire 15 extended out of the end face 131a.

Thereafter, a drying process may be performed, as shown at step S4. After drying the adhesive 40, applied in the steps S2 and S3, a lamp device 1 is completed which is fixed with the arc tube 10 on the reflection mirror 20.

The above method can carry out an injection of an adhesive for bonding between the cylinder 23 and the encapsulation 13a and an application of an adhesive for blocking light at the end of the encapsulation 13a, in a continuous fashion. Because those processes can be done by use of the same adhesive, jigs, etc., and manufacturing cost can be kept low or at a minimum for the lamp device 1.

When manufacturing the lamp device 3 in an exemplary embodiment, the adhesive 40 is temporarily cured prior to the process at step S3, to temporarily fix the cylinder 23 and the encapsulation 13a. Added separately is a process to bend the extension 151b of the lead wire 15a toward a direction different from the extension direction.

When manufacturing a lamp device 4 in an exemplary embodiment, the adhesive 40 at an opposite side to the reflecting direction may be coated at its surface by a heat-resistive paint 42.

Furthermore, when manufacturing a lamp device 5 in an exemplary embodiment, an alkalescent first adhesive 44 is satisfactorily used in place of the foregoing adhesive 40. The first adhesive 44 may be applied to further coat a second adhesive 45, higher in alkalinity and adhesion than the first adhesion 44, to the opposite surface of the adhesive 44 to the reflecting direction as well as the end face 25 of the cylinder 23 of the reflection mirror 20.

[Exemplary Projector Construction]

Figure 5:
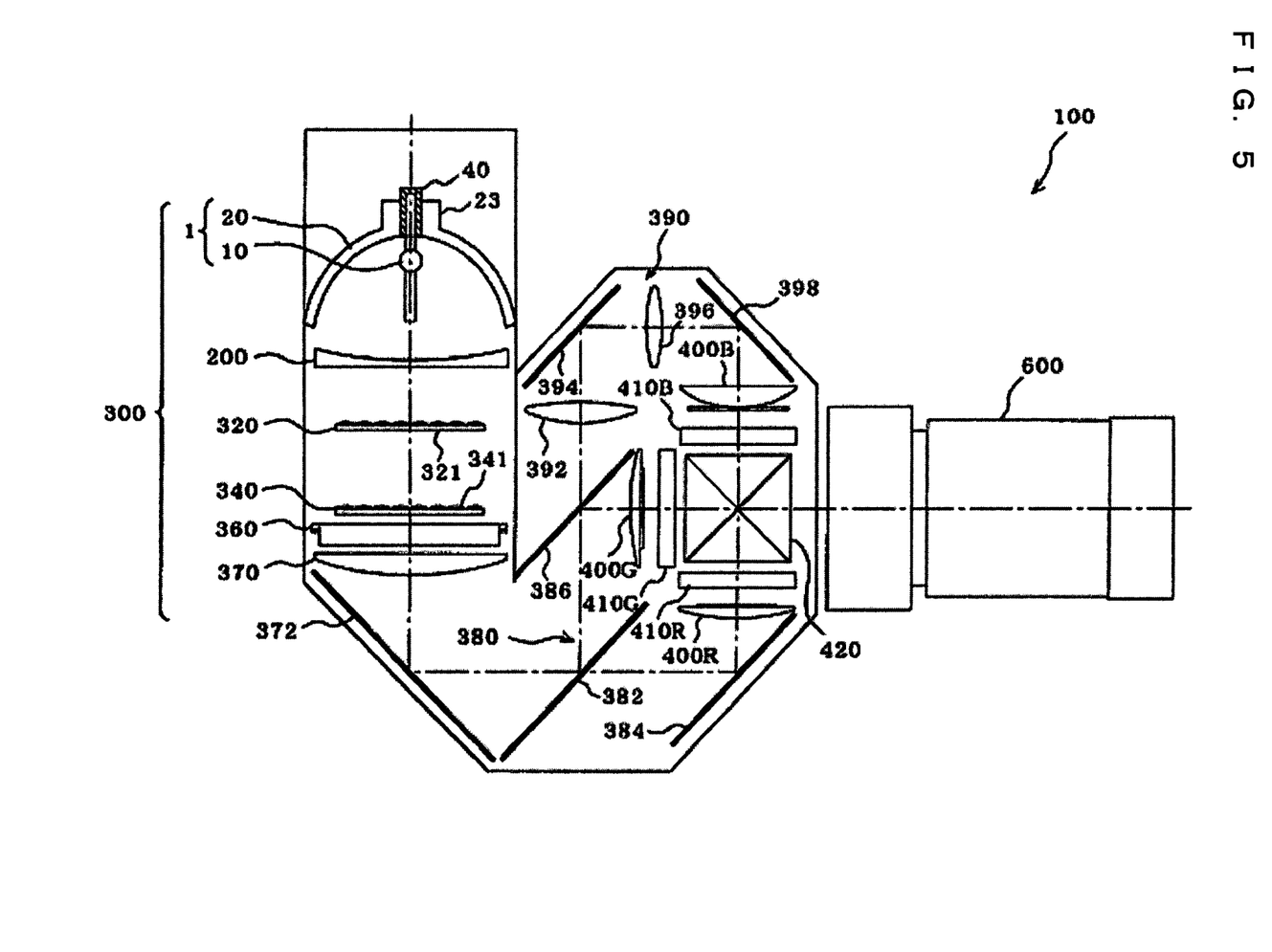
FIG. 5 is a construction schematic of a projector according to an exemplary embodiment of the invention.

FIG. 5 is a construction view of a projector 100 according to an exemplary embodiment. The projector 100 includes an illumination system 300 having any of the lamp devices 1-5, a color-separation optical system 380, a relay optical system 390, liquid-crystal panels 410R, 410G, 410B, a cross dichroic prism 420, a projection lens 600 and so on.

Now the function of the projector 100 will be explained in connection with the exemplary embodiments.

The illumination system 300 is an optical illumination integration system for substantially uniformly illuminating the image forming regions on the liquid-crystal panels 410R, 410G, 410B. The illumination system includes any of the lamp devices 1 to 5 in the exemplary embodiments, a first lens array 320, a second lens array 340, a polarization conversion element array 360 and a superimposing lens 370.

First, the emission light from the arc tube 10 enters a concave lens 200 directly or through a reflection mirror 20, thus being regulated in a light travel direction nearly parallel with an optical axis of the illumination system 300.

The collimated light is incident upon the small lenses 321 of the first lens array 320 and divided into a plurality of partial luminous fluxes commensurate with the number of small lenses 321. Furthermore, the partial luminous fluxes exited the first lens array 320 enters the second lens array 340 having small lenses 341 corresponding respectively to the small lenses 321.

The exit light from the second lens array 340 enters the polarization conversion element array 360 for aligning the polarization direction of light into the same kind of linearly-polarized light. The plurality of partial luminous fluxes aligned in polarization direction by the polarization conversion element array 360 enter the superimposing lens 370 where they are regulated such that the partial luminous fluxes to be incident upon the liquid-crystal panels 410R, 410G, 410B are superimposed together on the corresponding panel planes.

The light exited the superimposing lens 370 is reflected by the reflection mirror 372 and then incident upon the color-separation optical system 380. The color-separation optical system 380 is an optical system for separating the light exited the illumination system 300 into red, green and blue, or three colors of light, the color-separation optical system 380 having dichroic mirrors 382, 386 and a reflection mirror 384.

The first dichroic mirror 382 allows a red light component of the light exited the superimposing lens 370 to transmit but reflects blue and green light components. The red color component transmits through the first dichroic mirror 382 and reflects upon the reflection mirror 384, to reach the liquid-crystal panel 410R for red light by way of a field lens 400R. The green light component, of the blue and green light components reflected by the first dichroic mirror 382, reflects upon the dichroic mirror 386 and reaches the liquid-crystal panel 410G for green light by way of a field lens 400G.

The blue light component transmits through the second dichroic mirror 386 and enters the relay optical system 390. The relay optical system 390 is an optical system having a function to guide the blue light transmitted from the dichroic mirror 386 of the color-separation optical system 380 to the liquid-crystal panel 400B. The relay optical system 390 has a light incident-side lens 392, a relay lens 396 and reflection mirrors 394, 398.

Namely, the blue light component passes the light incident-side lens 392, the reflection mirror 394, the relay lens 396 and the reflection mirror 398 and further reaches the liquid-crystal panel 410B for blue light through the field lens 400B. The relay optical system 390 is used for blue light because blue light is longer in length of optical path than other colors and hence light utilization efficiency may be prevented from lowering or reducing due to light scattering, etc. Namely, this is in order to convey the partial luminous fluxes incident upon the light incident-side lens 392, as it is, to the field lens 400B. The relay optical system 390, although structured to pass the blue light of the three colors of light, may be structured to pass another color of light, for example, red light.

Subsequently, the three liquid-crystal panels 410R, 410G, 410B modulate the respective colors of incident light according to a provided image information, to form images in respective colors. Incidentally, polarizers are usually provided on light incident and exit sides of the liquid-crystal panel 410R, 410G, 410B.

Subsequently, the respective colors of modulated light exited the liquid-crystal panels 410R, 410G, 410B enter the cross dichroic prism 420 as a light combining system for combining those of modulated light and forming a color image. In the cross dichroic prism 420, there are formed a dielectric multi-layer film for reflecting red light and a dielectric multi-layer film for reflecting blue light, substantially in an X-form at the interfaces of four rectangular prisms. Three colors of light are combined together by these dielectric multi-layer films.

The color image exited the cross dichroic prism 420 is projected with magnification by the projection lens 600 onto a screen.

According to the projector 100, because any of the lamp devices 1 to 5 may be used, the adhesive 40 blocks the light from leaking in a direction opposite to the reflection surface at the end of the encapsulation 13a of the arc tube 10 secured on the reflection mirror 20, similar to the exemplary embodiments discussed above with respect to the lamp devices 1 to 5. Thus, an adverse effect upon the components arranged in the rear of the lamp devices 1 to 5 may be avoided. In this case, because of no necessity of arranging an especial light-shielding component at the rear of the lamp devices 1 to 5, the quality of the projector 100 may be improved, while reducing the number of components and diminishing the cost for the projector 100.

The projector 100 of the exemplary embodiments is not limited to the above embodiment but can be practiced in various forms within the scope and spirit of the exemplary embodiments. For example, possible modifications follow.

Although the above exemplary embodiments use two lens arrays 120, 130 for dividing the light of any of the lamp devices 1 to 5 into a plurality of partial luminous fluxes, the exemplary embodiments are applicable to a projector not using such a lens array.

Although the above exemplary embodiments include using the transmission liquid-crystal panels, the exemplary embodiments are not limited to transmission liquid-crystal panels alone, but can be applied to, for example, a projector using reflective liquid-crystal panels. In the case of a projector using reflective liquid-crystal panels, structuring is possible only by liquid-crystal panels without requiring a pair of polarizers. Moreover, on a projector using reflective liquid-crystal panels, the cross dichroic prism in some cases is used as a color separation device to separate illumination light into red, green and blue colors and as a color combining device to combine again the modulated three colors of light exiting in the same direction. There are cases of using a dichroic prism combining a plurality of dichroic prisms in a triangular or quadrangular pyramid form instead of the cross dichroic prism. When the exemplary embodiments are applied to a projector using reflective liquid-crystal panels, effect can be obtained nearly similarly to the projector using transmission liquid-crystal panels.

Although the exemplary embodiments were discussed only with respect to the example with the projector using three liquid-crystal panels as modulators, however, the exemplary embodiments also are applicable to a projector using one, two or four or more liquid-crystal panels.

Furthermore, the light modulator for modulating incident light and generating an image is not limited to the liquid-crystal panel, for example, the light modulator may be a device using a micro-mirror. Furthermore, the lamp device of the exemplary embodiments may be applied to a front projector for projecting an image in a direction observing the projection plane or a rear projector for projecting an image in a direction opposite to observing the projection plane.

[Exemplary Industrial Applicability]

As in the above, the lamp device of the exemplary embodiments can be broadly utilized as a light source for a projector or other various optical devices.

What is claimed is:

1. A lamp device, comprising:
a reflection mirror having a concave reflection surface and a cylinder provided centrally of the reflection mirror; and
an arc tube including:
a bulb positioned on a side of the reflection mirror corresponding to the concave reflection surface,
electrodes incorporated in the bulb, and
a pair of encapsulations formed continuously from the bulb and supporting the bulb, one encapsulation of the pair of encapsulations being inserted in the cylinder and being secured directly to the cylinder by a light-shielding adhesive inserted between the cylinder and the one encapsulation, the bulb being supported only by the light-shielding adhesive and the one encapsulation in the cylinder, the one encapsulation having an outer periphery that opposes inner surfaces of the cylinder, the outer periphery being covered with the light-shielding adhesive and including an end face and opposing side surfaces of the one encapsulation, the light-shielding adhesive having a surface coated with a heat-resistive paint having a viscosity lower than the light-shielding adhesive.

2. The lamp device according to claim 1, further comprising:
a power feed line to feed power to the electrode extended from the end face of the one encapsulation secured in the cylinder,
the power feed line having an extension from the end face sustained by the light-shielding adhesive.

3. The lamp device according to claim 2, wherein the power feed line is bent at the extension to a direction different from a direction of being extended from the end face, a bend of which is covered by the light-shielding adhesive.

4. The lamp device according to claim 1, wherein the adhesive securing the cylinder and the encapsulation, and the light-shielding adhesive being of a same kind.

5. A projector, comprising:
a light source having the lamp device according to claim 1;
a light modulator to modulate a luminous flux emitted from the light source according to image information and to form an image; and
a projection lens to project the image.

6. The projector according to claim 5, wherein the light-shielding adhesive has a surface coated with a heat-resistive paint having a viscosity lower than the light-shielding adhesive.

7. The projector according to claim 5, further comprising:
a power feed line to feed power to the electrode extended from the end face of the one encapsulation secured in the cylinder,
the power feed line having an extension from the end face sustained by the light-shielding adhesive.

8. The projector according to claim 7, wherein the power feed line is bent at the extension to a direction different from a direction of being extended from the end face, a bend of which is covered by the light-shielding adhesive.

9. The projector according to claim 5, wherein the adhesive securing the cylinder and the encapsulation, and the light-shielding adhesive is of a same kind.

10. A method for manufacturing a lamp device, the lamp device including an arc tube that includes a bulb that incorporates electrodes, and a pair of encapsulations formed continuously from the bulb and supporting the bulb, one encapsulation of the pair of encapsulations being inserted in a cylinder provided centrally of a reflection mirror having a concave reflection surface such that the bulb is positioned on a of the reflection mirror corresponding to the reflection surface, thereby securing the one encapsulation directly to the cylinder with a light-shielding adhesive, the method for manufacturing the lamp device comprising:
aligning the bulb with the one encapsulation inserted in the cylinder, relative to the reflection surface; and
injecting the light-shielding adhesive in a gap between the cylinder and the one encapsulation inserted in the cylinder so that the one encapsulation is secured directly to the cylinder by the light-shielding adhesive and the bulb is supported only by the light-shielding adhesive and the one encapsulation in the cylinder, the one encapsulation having an outer periphery that opposes inner surfaces of the cylinder, the outer periphery including an end face and opposing side surfaces, and the light-shielding adhesive entirely covering the outer periphery, the light-shielding adhesive having a surface coated with a heat-resistive paint having a viscosity lower than the light-shielding adhesive.

* * * * *